United States Patent [19]

Kurita

[11] Patent Number: 4,521,086
[45] Date of Patent: Jun. 4, 1985

[54] OBJECTIVE FOR AN IC MASK TESTING DEVICE
[75] Inventor: Hiroyuki Kurita, Tokyo, Japan
[73] Assignee: Olympus Optical Co., Ltd., Tokyo, Japan
[21] Appl. No.: 509,798
[22] Filed: Jun. 30, 1983
[30] Foreign Application Priority Data Jul. 14, 1982 [JP] Japan .................. 57-121346

[51] Int. Cl.³ .................... G02B 21/02; G02B 9/62
[52] U.S. Cl. .................... 350/464; 350/414
[58] Field of Search ................... 350/414, 464
[56] References Cited

U.S. PATENT DOCUMENTS 4,232,941 11/1980 Tojo ..................... 350/414

FOREIGN PATENT DOCUMENTS 47-45741 12/1972 Japan .
47-45742 12/1972 Japan .

Primary Examiner—John K. Corbin
Assistant Examiner—Scott J. Sugarman
Attorney, Agent, or Firm—Cushman, Darby & Cushman

[57] ABSTRACT

An objective for an IC mask testing device comprising a first, second, third, fourth, fifth and sixth lens components wherein the first lens component is a positive meniscus lens, the second lens component is a biconvex lens, the third lens component is a cemented doublet consisting of a biconvex lens and a biconcave lens, the fourth lens component is a cemented doublet consisting of a biconcave lens and a biconvex lens, the fifth lens component is a biconvex lens, and the sixth lens component is a negative meniscus lens, the objective for an IC mask testing device having favorably corrected chromatic aberration for the fluorescent wavelength as well as favorably corrected chromatic aberration in general, a long working distance and high magnification.

6 Claims, 7 Drawing Figures

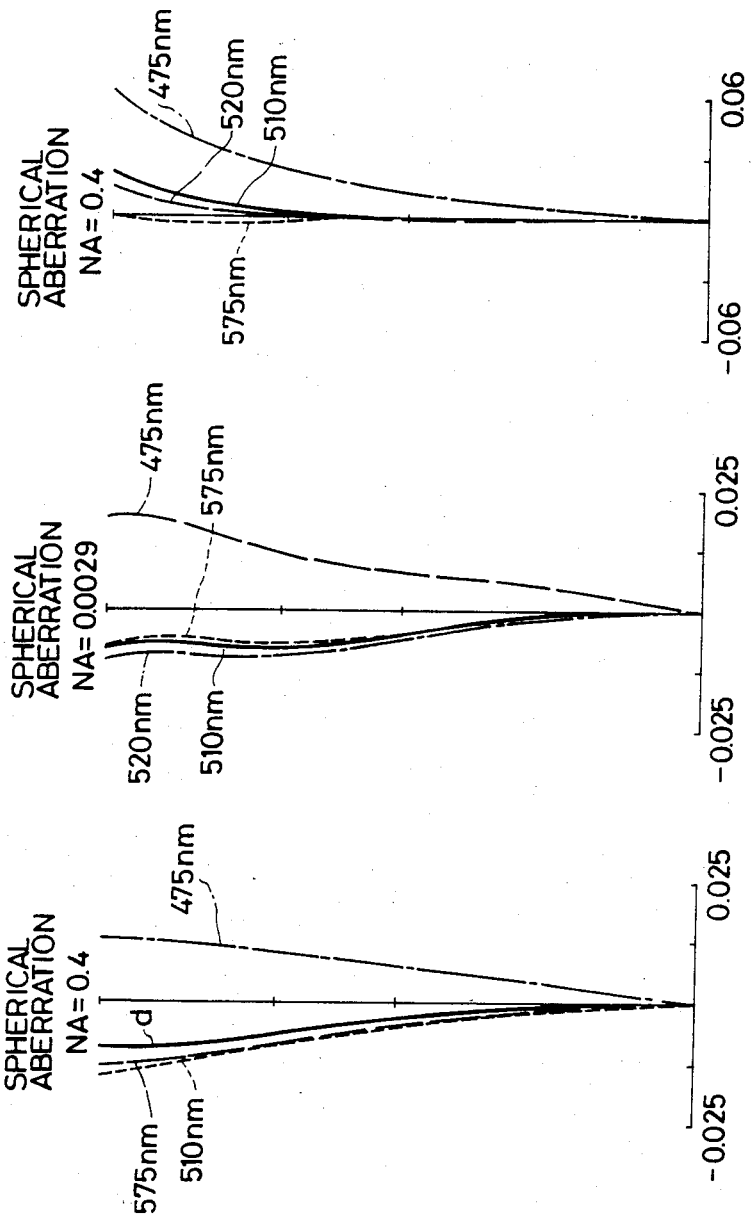

OBJECTIVE FOR AN IC MASK TESTING DEVICE

BACKGROUND OF THE INVENTION (a) Field of the invention:

The present invention relates to an objective to be used for an IC mask testing device with a flying spot scanner employing a fluorescent substance.

(b) Description of the prior art:

An objective for an IC mask testing device should have high resolving power, flat image surface from the center of the field to the marginal portion, small distortion and long working distance due to the fact that the mask patterns are very minute. Besides, chromatic aberration should be corrected satisfactorily and, moreover, chromatic aberration should be corrected favourably even for the wavelength of the fluorescent light to be used.

Microscope objectives disclosed in Japanese published unexamined patent applications Nos. 45741/72 and 45742/72 are known as lens systems having lens configurations resembling the lens configuration of the objective according to the present invention. These known objectives are usable at low magnifications about 20× and 40×. However, at a high magnification about 140× which is an objective of the present invention, said known objectives are not usable because they cannot fulfill the above-mentioned requirements. Furthermore, none of known microscope objectives with high magnifications about 100× have a satisfactorily long working distance which is also an object of the present invention. Moreover, there is no known objective of which chromatic aberration for the fluorescent wavelength is corrected favourably in addition to chromatic aberration in general.

SUMMARY OF THE INVENTION

It is, therefore, a primary object of the present invention to provide an objective for an IC mask testing device of which the image surface is flat, distortion is extremely small, chromatic aberration for the fluorescent light having Gaussian spectrum with the central wavelength of 510 nm is corrected favourably as well as chromatic aberration in general, working distance is long and magnification is high.

The lens system according to the present invention comprises a first, second, third, fourth, fifth and sixth lens components as shown in FIG. 1 wherein the first lens component is a positive meniscus lens, the second lens component is a biconvex lens, the third lens component is a cemented doublet consisting of a biconvex lens and a biconcave lens, the forth lens component is a cemented doublet consisting of a biconcave lens and a biconvex lens, the fifth lens component is a biconvex lens, and the sixth lens component is a negative meniscus lens.

The lens system according to the present invention is composed of a front lens group comprisitn the first through the fifth lens components and having positive refractive power and a rear lens group comprising the sixth lens component and having negative refractive power in order to thereby make the working distance long. Besides, in order to correct curvature of field and distortion, the front lens group is arranged as a Gauss type lens group, and it is so arranged to correct these aberrations favourably by means of concave surfaces which are facing each other in said Gauss type lens group (i.e., the surface on the image side of the third lens component and the surface on the object side of the fourth lens component). Besides, the above-mentioned curvature of field and distortion are corrected favourably also by arranging the rear lens group (the sixth lens component) as a meniscus lens. Thus, the lens system according to the present invention is arranged that curvature of field and distortion thereof are extremely small.

Moreover, to correct chromatic aberration, glass materials with low dispersion (with large Abbe's numbers) are used for the first lens component, the second lens component and the positive lens (lens element on the object side) in the third lens component for which angles in respect to rays are comparatively large, glass materials with high dispersion (with small Abbe's numbers) are used for the lens element on the image side in the third lens component and lens element on the object side in the fourth lens component which are located in somewhat rear positions in the front lens group, and glass materials with low dispersion (with large Abbe's numbers) are used for the lens element on the image side in the fourth lens component and the fifth lens component which are arranged on the rear side in the front lens group. By the above-mentioned arrangements, chromatic aberration of the front lens group is corrected favourably.

The lens system according to the present invention is arranged to fulfill the conditions (1) through (3) shown below in addition to the fact that it is arranged to have the lens configuration described so far.

(1) $1.2f < f_p < 1.8f$ (2) $1.5f < f_1$ (3) $d_1 < 0.36f$.

In the conditions (1) through (3) shown in the above, reference symbol f represents the focal length of the lens system as a whole, reference symbol $f_p$ represents the total focal length of the first through the fifth lens components (of the front lens group), reference symbol $f_1$ represents the focal length of the first lens component, and reference symbol $d_1$ represents the thickness of the first lens component.

The conditions (1), (2) and (3) shown in the above are established for the purpose of making the working distance long. If the focal length $f_p$ of the front lens group (the total focal length of the first through the fifth lens components) becomes smaller than the lower limit of the condition (1), it is impossible to make the working distance of the lens system long. When $f_p$ becomes large, the working distance can be made long. However, if $f_p$ becomes larger than the upper limit of the condition (1), longitudinal chromatic aberration becomes unfavourable, and this is not desirable.

When, in the condition (3), the thickness $d_1$ of the first lens component becomes large, it is advantageous for correction of chromatic aberration. If, however, $d_1$ becomes larger than the limit defined by the condition (3), it is impossible to make the working distance long.

Besides, if the focal length $f_1$ of the first lens component becomes smaller than the limit defined by the condition (2), it is impossible to make the wording distance long.

The lens system according to the present invention is arranged to eliminate curvature of field, distortion and coma by arranging that radii of curvature $r_{13}$ and $r_{14}$ of respective surfaces of the rear lens group (the sixth lens component), which is a meniscus lens, fulfill the conditions (4) and (5) shown below.

(4) $1.27f < r_{13} < 1.40f$ (5) $1.0f < r_{14} < 1.05f$

If $r_{13}$ and/or $r_{14}$ become larger than the upper limits of the conditions (4) and/or (5), curvature of field increases. When $r_{13}$ and $r_{14}$ are small, it is advantageous for correction of curvature of field. If, however, $r_{13}$ and/or $r_{14}$ become smaller than the lower limits of the conditions (4) and/or (5), distortion increases. Besides, the balance of coma becomes unfavourable and it is impossible to correct it by the other lens surfaces.

To correct chromatic aberration of the objective according to the present invention more favourably, it is preferable that Abbe's number $\nu_2$ of the second lens component, Abbe's number $\nu_3$ of the lens element on the object side (positive lens) in the third lens component and Abbe's number $\nu_6$ of the lens element on the image side (positive lens) in the fourth lens component respectively fulfill the condition (6) shown below.

(6) $\nu_2, \nu_3, \nu_6 > 65$.

By using glass materials with large Abbe's numbers for the second lens component, positive lens in the third lens component and positive lens in the fourth lens component as defined by the condition (6) shown in the above, it is possible to correct chromatic aberration satisfactorily favourable. If $\nu_2$, $\nu_3$ and/or $\nu_6$ become smaller than the lower limit defined by the condition (6), the secondary spectrum increases and it is impossible to correct longitudinal chromatic aberration and lateral chromatic aberration favourably.

As described so far, the lens system having the lens configuration shown in FIG. 1 and fulfilling the conditions (1) through (6) enables to attain the object of the present invention. However, when the lens system according to the present invention is arranged to further fulfill the conditions (7) through (10) shown below, it is possible to obtain a lens system with aberrations corrected more favourably.

(7) $0.6f < d_{13} < 0.7f$ (8) $0.03f < d_{12} < 0.13f$ (9) $n_4, n_5 > 1.65$

(10) $\nu_4, \nu_5 < 40$.

In the conditions (7) through (10) shown in the above, reference symbol $d_{12}$ represents the airspace between the fifth and sixth lens components, reference symbol $d_{13}$ represents the thickness of the sixth lens component, reference symbol $n_4$ represents the refractive index of the negative lens (lens element on the image side) in the third lens component, reference symbol $n_5$ represents the refractive index of the negative lens (lens element on the object side) in the fourth lens component, reference symbol $\nu_4$ represents Abbe's number of the negative lens in the third lens component, and reference symbol $\nu_5$ represents Abbe's number of the negative lens in the fourth lens component.

The conditions (7) and (8) shown in the above relate to curvature of field. When $d_{13}$ in the condition (7) is made large, it is advantageous for correction of curvature of field. If, however, $d_{13}$ becomes larger than the upper limit of the condition (7), chromatic aberration becomes unfavourable (the curve of longitudinal chromatic aberration increases), and it is impossible to correct it. If $d_{13}$ becomes smaller than the lower limit of the condition (7), curvature of field and spherical aberration increase, astigmatism becomes large, and it is impossible to correct them. As for $d_{12}$, the case is inverse to $d_{13}$. That is, if $d_{12}$ becomes larger than the upper limit of the condition (8), curvature of field, spherical aberration and astigmatism increase. If $d_{12}$ becomes smaller than the lower limit of the condition (9), the curve of longitudinal chromatic aberration increases.

The conditions (9) and (10) are established for the purpose of correcting chromatic aberration. When refractive indices of the lens elements constituting the Gauss type lens group and arranged with the concave surfaces thereof facing each other are made high, it is possible to correct coma and curvature of field. Besides, by making Abbe's numbers of said lens elements small, it is possible to make the absolute value of longitudinal chromatic aberration small. If refractive indices $n_4$ and/or $n_5$ do not fulfill the condition (9), coma and curvature of field become unfavourable. If $\nu_4$ and/or $\nu_5$ do not fulfill the condition (10), longitudinal chromatic aberration becomes unfavourable.

BRIEF DESCRIPTION OF THE DRAWINGS

FIGS. 5 through 7 respectively show graphs illustrating spherical aberration curves of Embodiments 1 through 3 of the objective according to the present invention for the fluorescent light.

DETAILED DESCRIPTION OF THE PREFERRED EMBODIMENTS

Figure 1:
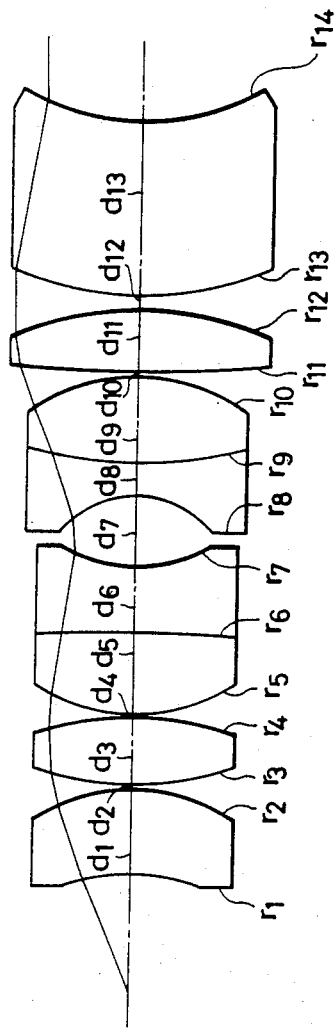
FIG. 1 shows a sectional view of the objective according to the present invention.

Now, preferred embodiments of the objective for IC mask testing device according to the present invention are shown below.

|  | Embodiment 1 |  |  |
|---|---|---|---|
| $r_1 = -0.907$ |  |  |  |
| $d_1 = 0.347$ | $n_1 = 1.72916$ | $\nu_1 = 54.68$ |  |
| $r_2 = -0.692$ |  |  |  |
| $d_2 = 0.017$ |  |  |  |
| $r_3 = 1.287$ |  |  |  |
| $d_3 = 0.268$ | $n_2 = 1.49700$ | $\nu_2 = 81.61$ |  |
| $r_4 = -1.517$ |  |  |  |
| $d_4 = 0.017$ |  |  |  |
| $r_5 = 0.789$ |  |  |  |
| $d_5 = 0.330$ | $n_3 = 1.49700$ | $\nu_3 = 81.61$ |  |
| $r_6 = -7.468$ |  |  |  |
| $d_6 = 0.267$ | $n_4 = 1.65128$ | $\nu_4 = 38.25$ |  |
| $r_7 = 0.573$ |  |  |  |
| $d_7 = 0.309$ |  |  |  |
| $r_8 = -0.419$ |  |  |  |
| $d_8 = 0.124$ | $n_5 = 1.72047$ | $\nu_5 = 34.72$ |  |
| $r_9 = 1.892$ |  |  |  |
| $d_9 = 0.361$ | $n_6 = 1.51728$ | $\nu_6 = 69.56$ |  |
| $r_{10} = -0.758$ |  |  |  |
| $d_{10} = 0.019$ |  |  |  |
| $r_{11} = 7.471$ |  |  |  |
| $d_{11} = 0.253$ | $n_7 = 1.65830$ | $\nu_2 = 57.33$ |  |
| $r_{12} = -1.314$ |  |  |  |
| $d_{12} = 0.050$ |  |  |  |
| $r_{13} = 1.354$ |  |  |  |
| $d_{13} = 0.699$ | $n_8 = 1.78650$ | $\nu_8 = 50.00$ |  |

-continued

| | | |
|---|---|---|
| $r_{14} = 1.032$ | | |
| $f = 1$, | $NA = 0.4$, | magnification 140X |
| $f_p = 1.31$, | $f_1 = 2.38$, | $WD = 0.478$ |
| | Embodiment 2 | |
| $r_1 = 0.903$ | | |
| $d_1 = 0.343$ | $n_1 = 1.72916$ | $\nu_1 = 54.68$ |
| $r_2 = -0.651$ | | |
| $d_2 = 0.017$ | | |
| $r_3 = 1.652$ | | |
| $d_3 = 0.266$ | $n_2 = 1.49700$ | $\nu_2 = 81.61$ |
| $r_4 = -1.333$ | | |
| $d_4 = 0.017$ | | |
| $r_5 = 0.641$ | | |
| $d_5 = 0.327$ | $n_3 = 1.49700$ | $\nu_3 = 81.61$ |
| $r_6 = -3.387$ | | |
| $d_6 = 0.265$ | $n_4 = 1.65412$ | $\nu_4 = 39.70$ |
| $r_7 = 0.514$ | | |
| $d_7 = 0.306$ | | |
| $r_8 = -0.426$ | | |
| $d_8 = 0.265$ | $n_5 = 1.72047$ | $\nu_5 = 34.72$ |
| $r_9 = 1.579$ | | |
| $d_9 = 0.327$ | $n_6 = 1.51821$ | $\nu_6 = 65.04$ |
| $r_{10} = -0.803$ | | |
| $d_{10} = 0.018$ | | |
| $r_{11} = 4.165$ | | |
| $d_{11} = 0.266$ | $n_7 = 1.65830$ | $\nu_7 = 57.33$ |
| $r_{12} = -1.636$ | | |
| $d_{12} = 0.049$ | | |
| $r_{13} = 1.286$ | | |
| $d_{13} = 0.615$ | $n_8 = 1.78650$ | $\nu_8 = 50.00$ |
| $r_{14} = 1.023$ | | |
| $f = 1$, | $NA = 0.4$, | magnification 140X |
| $f_p = 1.22$, | $f_1 = 1.855$, | $WD = 0.425$ |
| | Embodiment 3 | |
| $r_1 = -0.901$ | | |
| $d_1 = 0.317$ | $n_1 = 1.72916$ | $\nu_1 = 54.68$ |
| $r_2 = -0.645$ | | |
| $d_2 = 0.017$ | | |
| $r_3 = 1.396$ | | |
| $d_3 = 0.266$ | $n_2 = 1.49700$ | $\nu_2 = 81.61$ |
| $r_4 = -1.569$ | | |
| $d_4 = 0.017$ | | |
| $r_5 = 0.749$ | | |
| $d_5 = 0.328$ | $n_3 = 1.49700$ | $\nu_3 = 81.61$ |
| $r_6 = -5.979$ | | |
| $d_6 = 0.266$ | $n_4 = 1.66998$ | $\nu_4 = 39.32$ |
| $r_7 = 0.534$ | | |
| $d_7 = 0.307$ | | |
| $r_8 = -0.408$ | | |
| $d_8 = 0.123$ | $n_5 = 1.72047$ | $\nu_5 = 34.72$ |
| $r_9 = 6.597$ | | |
| $d_9 = 0.359$ | $n_6 = 1.49700$ | $\nu_6 = 81.61$ |
| $r_{10} = -0.647$ | | |
| $d_{10} = 0.018$ | | |
| $r_{11} = 4.339$ | | |
| $d_{11} = 0.252$ | $n_7 = 1.65830$ | $\nu_7 = 57.33$ |
| $r_{12} = -1.697$ | | |
| $d_{12} = 0.127$ | | |
| $r_{13} = 1.341$ | | |
| $d_{13} = 0.617$ | $n_8 = 1.78650$ | $\nu_8 = 50.00$ |
| $r_{14} = 1.016$ | | |
| $f = 1$, | $NA = 0.4$, | magnification 140X |
| $f_p = 1.26$, | $f_1 = 2.03$, | $WD = 0.412$ |

In embodiments shown in the above, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses for d-line, and reference symbols $\nu_1$ through $\nu_8$ respectively show Abbe's numbers of respective lenses for d-line.

Figure 2:
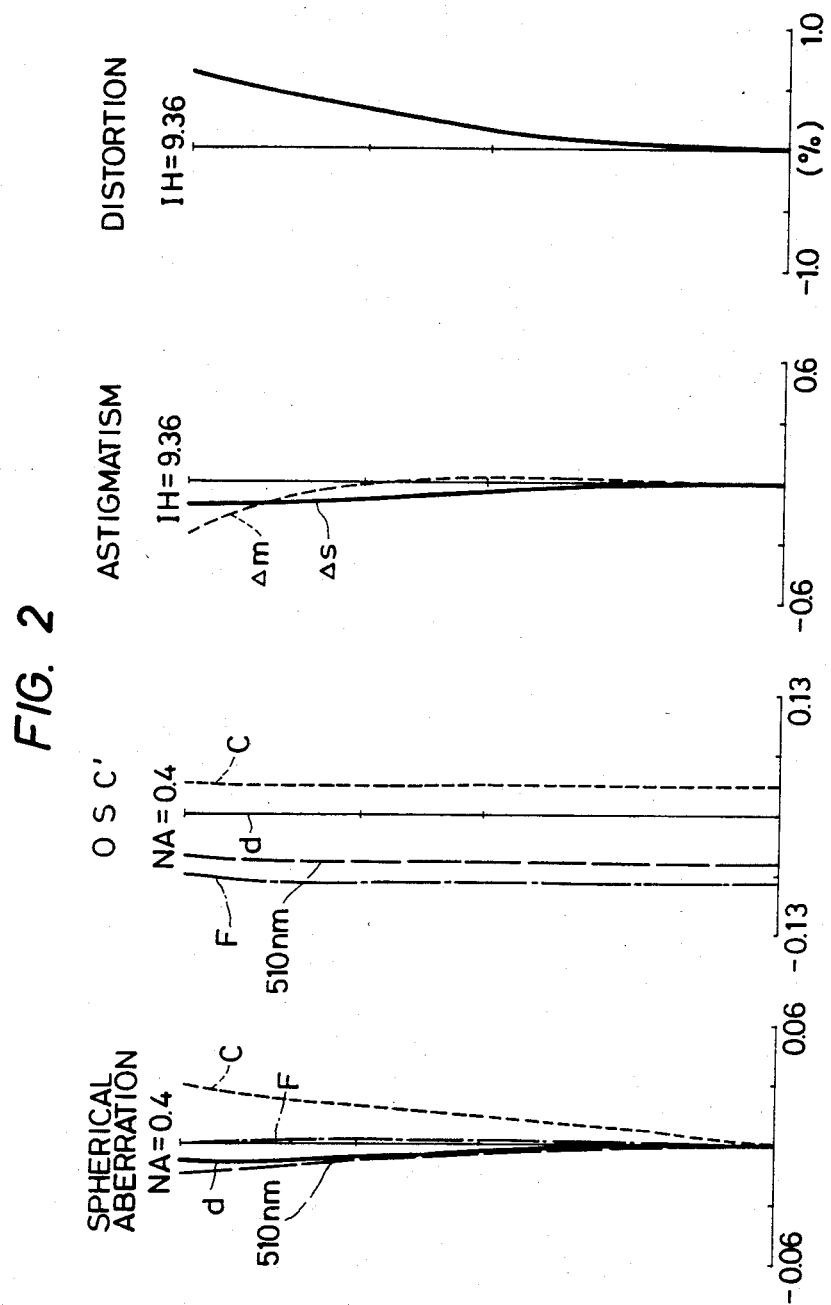
FIG. 2 through 4 respectively show graphs illustrating aberration curves of Embodiments 1 through 3 of the objective according to the present invention.
Figure 3:
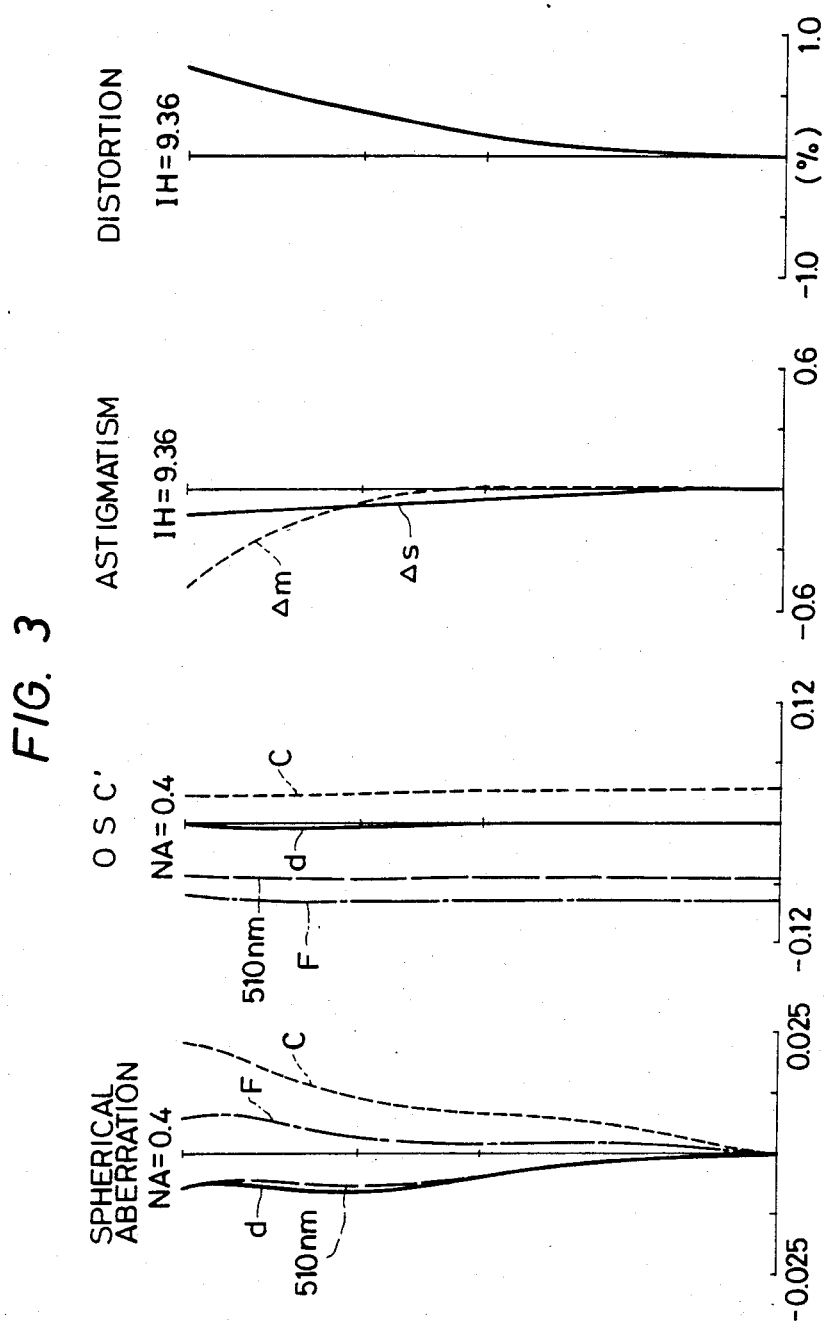
Figure 4:
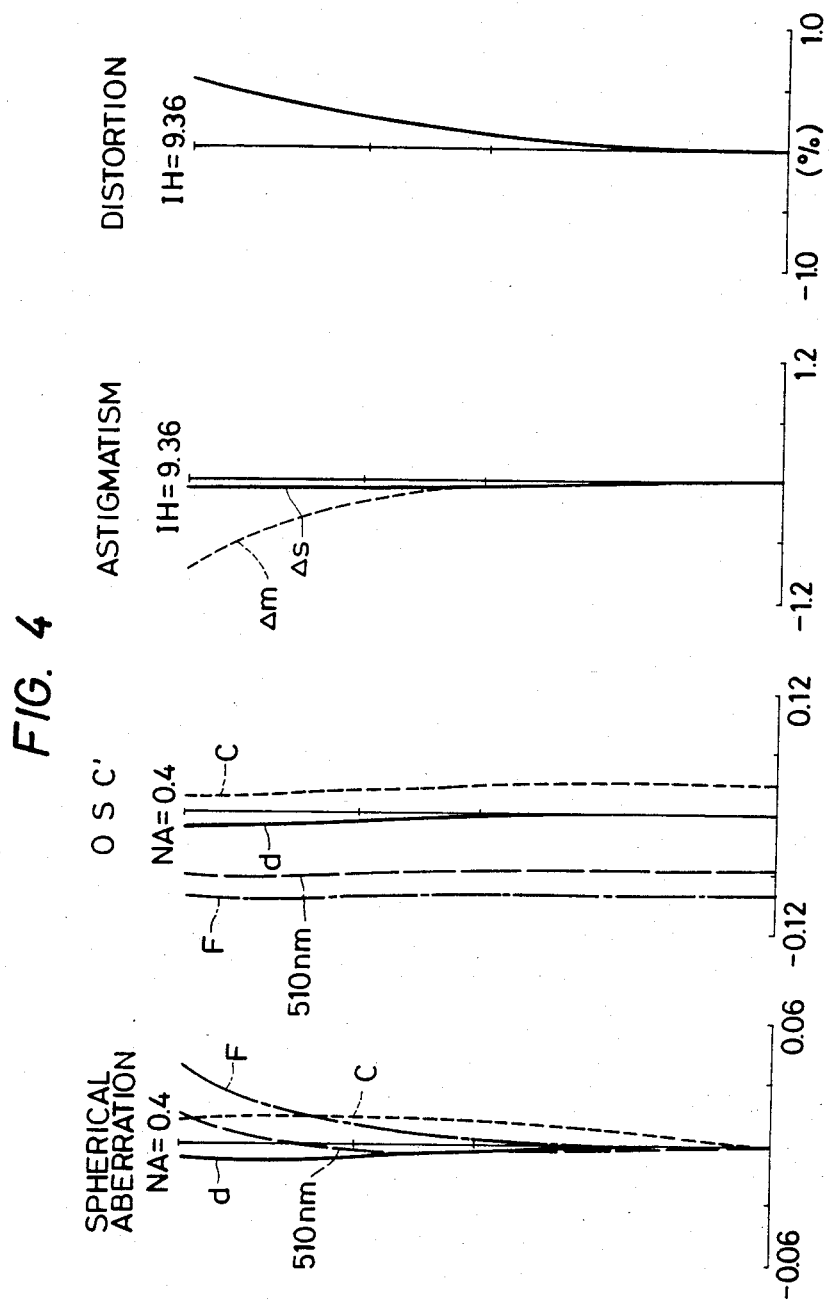

Aberration curves of the above-mentioned respective embodiments are shown in FIGS. 2 through 4. Out of these graphs of aberration curves, graphs of spherical aberration and OSC' show those for d-line, C-line, F-line, and wavelength of 510 nm. Besides, FIGS. 5 through 7 respectively show spherical aberration curves of Embodiments 1 through 3 for the fluorescent light having the spectrum with the central wavelength of 510 nm and half-width of 100 nm to be used with the flying spot scanner. That is, the spherical aberration curves shown in FIGS. 5 through 7 are those for 510 nm which is the central wavelength of the above-mentioned fluorescent light, and 475 nm and 575 nm which are the wavelengths at positions near both ends of the spectrum of above-mentioned fluorescent light. Furthermore, FIG. 5 shows the spherical aberration curve for d-line in addition to the above-mentioned wavelengths, and FIGS. 6 and 7 show spherical aberration curves for the wavelength of 520 nm in addition to the above-mentioned wavelengths.

As it is evident from the above-mentioned respective embodiments and graphs of aberration curves, the present invention provides an objective of which the image surface is flat, distortion is small, chromatic aberration is favourably corrected for both of ordinary light and fluorescent light and, moreover, the working distance is long.

I claim:

1. An objective for an IC mask testing device comprising a first, second, third, fourth, fifth and sixth lens components, said first lens component being a positive meniscus lens, said second lens component being a biconvex lens, said third lens component being a cemented doublet consisting of a biconvex lens and a biconcave lens, said fourth lens component being a cemented doublet consisting of a biconcave lens and a biconvex lens, said fifth lens component being a biconvex lens, said sixth lens component being a negative meniscus lens, said objective for an IC mask testing device being arranged to fulfill the conditions (1) through (5) shown below:

(1) $1.2f < f_p < 1.8f$ (2) $1.5f < f_1$ (3) $d_1 < 0.36f$ (4) $1.27f < r_{13} < 1.40f$ (5) $1.0f < r_{14} < 1.05f$ where, reference symbol f represents the focal length of the lens system as a whole, reference symbol $f_p$ represents the total focal length of the first through the fifth lens components, reference symbol $f_1$ represents the focal length of the first lens component, and reference symbol $d_1$ represents the thickness of the first lens component, and reference symbols $r_{13}$ and $r_{14}$ respectively represent radii of curvature of respective surfaces of the sixth lens component.

2. An objective for an IC mask testing device according to claim 1 further fulfilling the conditions (6) and (10) shown below:

(6) $\nu_2, \nu_3, \nu_6 > 65$

(10) $\nu_4, \nu_5, < 40$ where, reference symbols $\nu_2$, $\nu_3$ and $\nu_6$ respectively represent Abbe's numbers of the second lens component, lens element on the object side in the third lens component, and lens elements on the image side in the fourth lens component, and reference symbols $\nu_4$ and $\nu_5$ respectively represent Abbe's numbers of the lens element on the image side in the third lens component and lens element on the object side in the fourth lens component.

3. An objective for an IC mask testing device according to claim 2 further fulfilling the conditions (7) through (9) shown below:

(7) $0.6f < d_{13} < 0.7f$ (8) $0.03f < d_{12} < 0.13f$ (9) $n_4, n_5 > 1.65$ where, reference symbol $d_{13}$ represents the thickness of the sixth lens component, reference symbol $d_{12}$ represents the airspace between the fifth and sixth lens components, and reference symbols $n_4$ and $n_5$ respectively represent refractive indices of the lens element on the image side in the third lens component and lens element on the object side in the fourth lens component.

4. An objective for an IC mask testing device according to claim 3, in which said objective for an IC mask testing device has the following numerical data:

| | | |
|---|---|---|
| $r_1 = -0.907$ | | |
| $d_1 = 0.347$ | $n_1 = 1.72916$ | $\nu_1 = 54.68$ |
| $r_2 = -0.692$ | | |
| $d_2 = 0.017$ | | |
| $r_3 = 1.287$ | | |
| $d_3 = 0.268$ | $n_2 = 1.49700$ | $\nu_2 = 81.61$ |
| $r_4 = -1.517$ | | |
| $d_4 = 0.017$ | | |
| $r_5 = 0.789$ | | |
| $d_5 = 0.330$ | $n_3 = 1.49700$ | $\nu_3 = 81.61$ |
| $r_6 = -7.468$ | | |
| $d_6 = 0.267$ | $n_4 = 1.65128$ | $\nu_4 = 38.25$ |
| $r_7 = 0.573$ | | |
| $d_7 = 0.309$ | | |
| $r_8 = -0.419$ | | |
| $d_8 = 0.124$ | $n_5 = 1.72047$ | $\nu_5 = 34.72$ |
| $r_9 = 1.892$ | | |
| $d_9 = 0.361$ | $n_6 = 1.51728$ | $\nu_6 = 69.56$ |
| $r_{10} = -0.758$ | | |
| $d_{10} = 0.019$ | | |
| $r_{11} = 7.471$ | | |
| $d_{11} = 0.253$ | $n_7 = 1.65830$ | $\nu_7 = 57.33$ |
| $r_{12} = -1.314$ | | |
| $d_{12} = 0.050$ | | |
| $r_{13} = 1.354$ | | |
| $d_{13} = 0.699$ | $n_8 = 1.78650$ | $\nu_8 = 50.00$ |
| $r_{14} = 1.032$ | | |
| $f = 1$, | NA = 0.4, | magnification 140X |
| $f_p = 1.31$, | $f_1 = 2.38$, | WD = 0.478 | where, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses for d-line, and reference symbols $\nu_1$ through $\nu_8$ respectively represent Abbe's numbers of respective lenses for d-line.

5. An objective for an IC mask testing device according to claim 3, in which said objective for an IC mask testing device has the following numerical data:

| | | |
|---|---|---|
| $r_1 = 0.903$ | | |
| $d_1 = 0.343$ | $n_1 = 1.72916$ | $\nu_1 = 54.68$ |
| $r_2 = -0.651$ | | |
| $d_2 = 0.017$ | | |
| $r_3 = 1.652$ | | |
| $d_3 = 0.266$ | $n_2 = 1.49700$ | $\nu_2 = 81.61$ |
| $r_4 = -1.333$ | | |
| $d_4 = 0.017$ | | |
| $r_5 = 0.641$ | | |
| $d_5 = 0.327$ | $n_3 = 1.49700$ | $\nu_3 = 81.61$ |
| $r_6 = -3.387$ | | |
| $d_6 = 0.265$ | $n_4 = 1.65412$ | $\nu_4 = 39.70$ |
| $r_7 = 0.514$ | | |
| $d_7 = 0.306$ | | |
| $r_8 = -0.426$ | | |
| $d_8 = 0.265$ | $n_5 = 1.72047$ | $\nu_5 = 34.72$ |
| $r_9 = 1.579$ | | |
| $d_9 = 0.327$ | $n_6 = 1.51821$ | $\nu_6 = 65.04$ |
| $r_{10} = -0.803$ | | |
| $d_{10} = 0.018$ | | |
| $r_{11} = 4.165$ | | |
| $d_{11} = 0.266$ | $n_7 = 1.65830$ | $\nu_7 = 57.33$ |
| $r_{12} = -1.636$ | | |
| $d_{12} = 0.049$ | | |
| $r_{13} = 1.286$ | | |
| $d_{13} = 0.615$ | $n_8 = 1.78650$ | $\nu_8 = 50.00$ |
| $r_{14} = 1.023$ | | |
| $f = 1$, | NA = 0.4, | magnification 140X |
| $f_p = 1.22$, | $f_1 = 1.855$, | WD = 0.425 | where, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses for d-line, and reference symbols $\nu_1$ through $\nu_8$ respectively represent Abbe's numbers of respective lenses for d-line.

6. An objective for an IC mask testing device according to claim 3, in which said objective for an IC mask testing device has the following numerical data:

| | | |
|---|---|---|
| $r_1 = -0.901$ | | |
| $d_1 = 0.317$ | $n_1 = 1.72916$ | $\nu_1 = 54.68$ |
| $r_2 = -0.645$ | | |
| $d_2 = 0.017$ | | |
| $r_3 = 1.396$ | | |
| $d_3 = 0.266$ | $n_2 = 1.49700$ | $\nu_2 = 81.61$ |
| $r_4 = -1.569$ | | |
| $d_4 = 0.017$ | | |
| $r_5 = 0.749$ | | |
| $d_5 = 0.328$ | $n_3 = 1.49700$ | $\nu_3 = 81.61$ |
| $r_6 = -5.979$ | | |
| $d_6 = 0.266$ | $n_4 = 1.66998$ | $\nu_4 = 39.32$ |
| $r_7 = 0.534$ | | |
| $d_7 = 0.307$ | | |
| $r_8 = -0.408$ | | |
| $d_8 = 0.123$ | $n_5 = 1.72047$ | $\nu_5 = 34.72$ |
| $r_9 = 6.597$ | | |
| $d_9 = 0.359$ | $n_6 = 1.49700$ | $\nu_6 = 81.61$ |
| $r_{10} = -0.647$ | | |
| $d_{10} = 0.018$ | | |
| $r_{11} = 4.339$ | | |
| $d_{11} = 0.252$ | $n_7 = 1.65830$ | $\nu_7 = 57.33$ |
| $r_{12} = -1.697$ | | |
| $d_{12} = 0.127$ | | |
| $r_{13} = 1.341$ | | |
| $d_{13} = 0.617$ | $n_8 = 1.78650$ | $\nu_8 = 50.00$ |
| $r_{14} = 1.016$ | | |
| $f = 1$, | NA = 0.4, | magnification 140X |
| $f_p = 1.26$, | $f_1 = 2.03$, | WD = 0.412 | where, reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_8$ respectively represent refractive indices of respective lenses for d-line, and reference symbols $\nu_1$ through $\nu_8$ respectively represent Abbe's numbers of respective lenses for d-line.

* * * * *